United States Patent [19]

Takeuchi et al.

[11] Patent Number: 5,038,362
[45] Date of Patent: Aug. 6, 1991

[54] SPREAD SPECTRUM RECEIVER

[75] Inventors: Shigeru Takeuchi; Motohiro Gochi, both of Tokyo, Japan

[73] Assignee: Clarion Co., Ltd., Tokyo, Japan

[21] Appl. No.: 545,377

[22] Filed: Jun. 28, 1990

[30] Foreign Application Priority Data

Jul. 3, 1989 [JP] Japan ................................. 1-169791

[51] Int. Cl.$^5$ ............................................. H04B 1/00
[52] U.S. Cl. ...................................................... 375/1
[58] Field of Search ........................................... 375/1

[56] References Cited

U.S. PATENT DOCUMENTS

| 4,897,659 | 1/1990 | Mellow | 380/48 |
| 4,908,837 | 3/1990 | Mori et al. | 375/1 |
| 4,943,974 | 7/1990 | Motamedi | 375/1 |
| 4,943,977 | 7/1990 | Uchida et al. | 375/1 |

Primary Examiner—Thomas H. Tarcza
Assistant Examiner—David Cain
Attorney, Agent, or Firm—Wallenstein, Wagner & Hattis, Ltd.

[57] ABSTRACT

A spread spectrum receiver using a convolver controls the level of a reference signal applied to the convolver in response to comparison of a true correlation output and other correlation output of the convolver or, alternatively, in response to the level of received input signal.

6 Claims, 3 Drawing Sheets

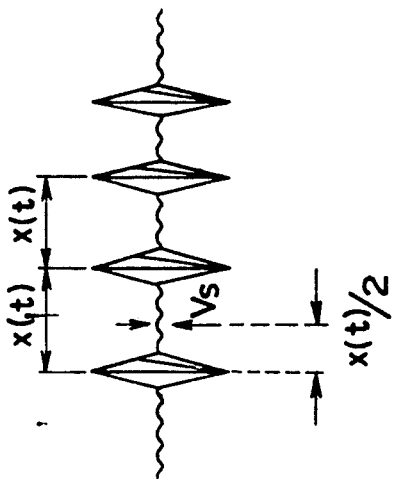
FIG. 3A  FIG. 3B  FIG. 3C
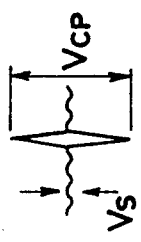
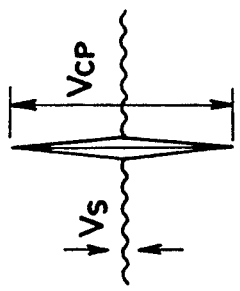
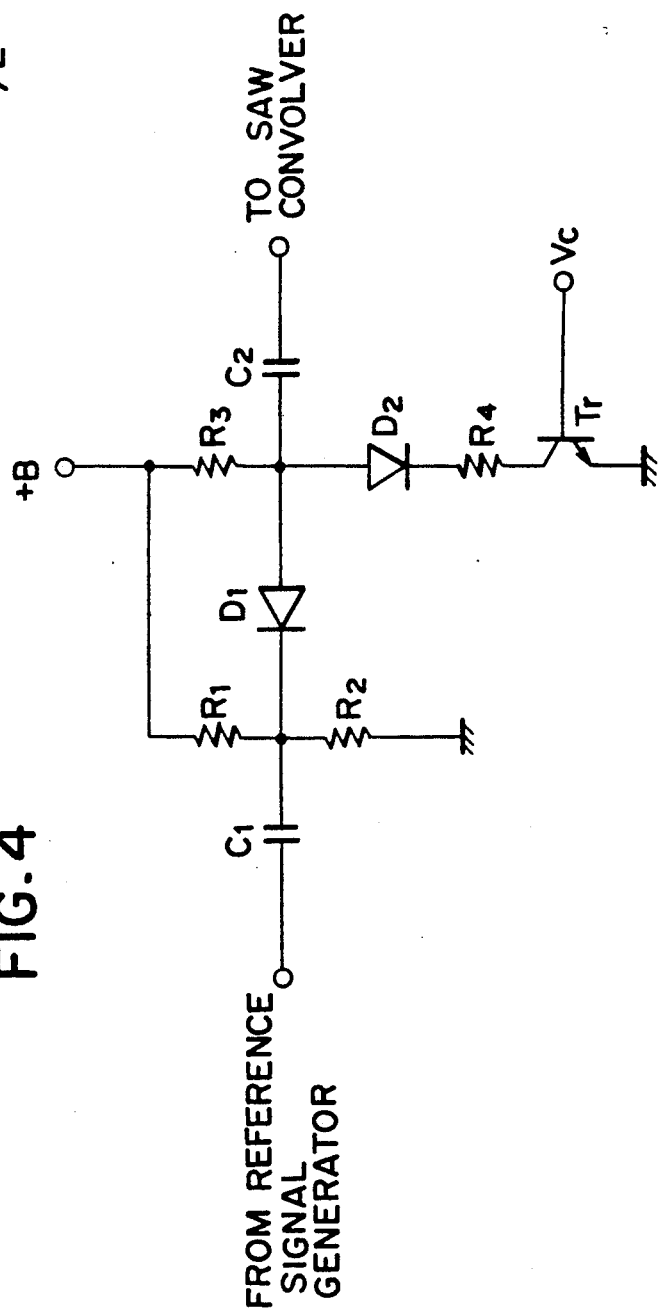
FIG. 4

SPREAD SPECTRUM RECEIVER

FIELD OF THE INVENTION

This invention relates to a spread spectrum receiver and, more particularly, to an improvement thereof for establishing high sensitivity and high efficiency of a convolver used in the receiver.

BACKGROUND OF THE INVENTION

In a spread spectrum receiver of a direct (DS) type using a convolver, information is demodulated from a correlation output which is obtained by applying a received input signal and a reference signal to the convolver.

In a conventional spread spectrum receiver, however, in which the level of a reference signal is constant, the peak value and the signal-to-noise (S/N) ratio of the correlation output vary with magnitude of the received input signal and deteriorates the efficiency of the receiver.

OBJECT OF THE INVENTION

It is therefore an object of the invention to prevent deterioration of the efficiency of a receiver by controlling the level of a reference signal to represent any optimum value instead of a constant value.

SUMMARY OF THE INVENTION

In order to attain the object, a first invention is based on a spread spectrum receiver using a convolver for obtaining a correlation output between a received input signal and a reference signal to perform demodulation, and the invention is characterized in the use of peak value comparator means for obtaining an output corresponding to a comparison of a true correlation output and other correlation output of said convolver; and reference signal control means for controlling the level of said reference signal in response to said output of said peak value comparator means.

A second invention is based on a spread spectrum receiver using a convolver for obtaining a correlation output between a received input signal and a reference signal to perform demodulation, and the invention is characterized in the use of detector means for producing a detected signal corresponding to the level of said received input signal; and reference signal control means for controlling the level of said reference signal in response to said detected signal.

Under the above-indicated arrangements, the level of the reference signal is controlled to represent an optimum value which is responsive to the ratio of the true correlation output and other correlation output of the convolver or, alternatively, responsive to the level of the received input signal.

BRIEF DESCRIPTION OF THE INVENTION

FIGS. 3a-3c are waveform diagrams of a correlation output;

FIG. 4 is a circuit diagram of a reference signal control circuit;

DESCRIPTION OF THE INVENTION

Figure 1:
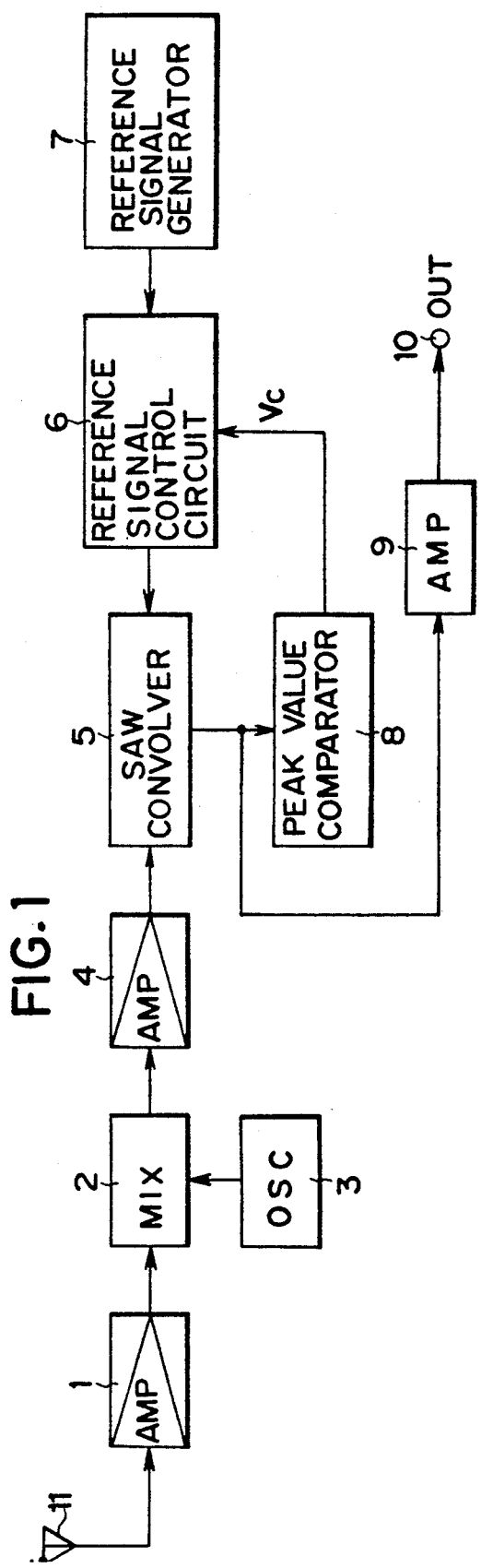
FIG. 1 is a block diagram of an embodiment of the invention.

The invention is described below, referring to preferred embodiments illustrated in the drawings.

FIG. 1 shows a spread spectrum receiver taken as an embodiment of the invention. Reference 1 refers to a high frequency amplifier, 2 to a mixer, 3 to a local oscillator, 4 to an intermediate frequency AGC amplifier, 5 to a surface acoustic wave convolver; 6 to a reference signal control circuit, 7 to a reference signal generator, 8 to a peak value comparator circuit, 9 to an amplifier, 10 to an output terminal, and 11 to a receiver antenna.

A received input signal coming through the antenna 11 is amplified by the amplifier 1, and it is frequency-converted by the mixer 2 into an input frequency (215MHz) for the convolver. The resulting intermediate frequency signal is amplified into a target signal level by the AGC amplifier 4, and it is subsequently supplied to the convolver 5. The convolver 5 is also supplied with a reference signal from the reference signal generator 7. The level of the reference signal is controlled by the control circuit 6 and by the peak value comparator circuit 8 in the following manner.

The peak value comparator circuit 8 obtains from an output of the convolver 5 a true correlation output (peak value) and other correlation output (spurious output), and supplies an output responsive to a comparison there between to the reference signal control circuit 6. The control circuit 6 controls the level of the reference signal to represent an optimum value in response to the output of the peak value comparator circuit 8.

Figure 2:
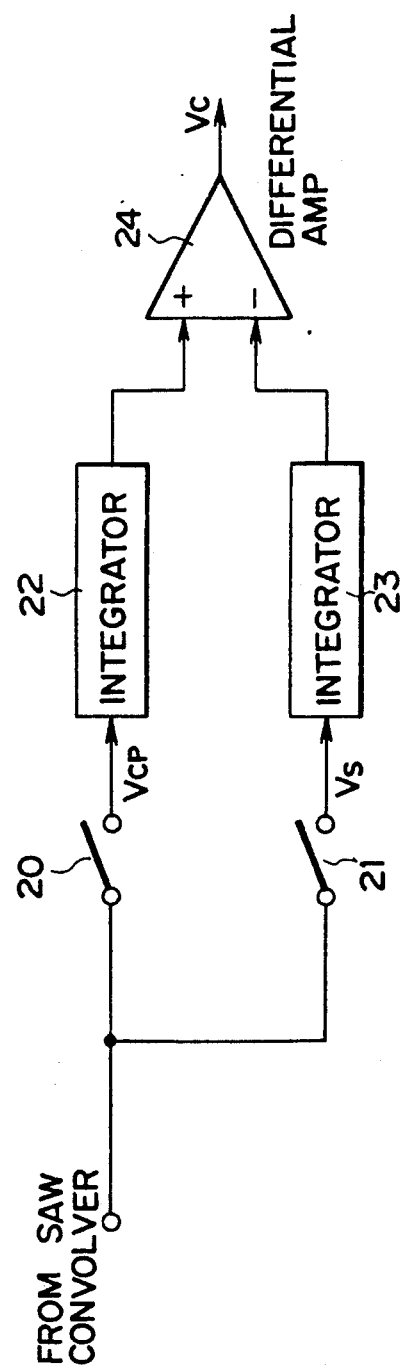
FIG. 2 is a block diagram of a peak value comparator circuit.

FIG. 2 shows an arrangement of the peak value comparator circuit 8 in which reference numerals 20 and 21 refer to switches, 22 and 23 to integrators, and 24 to a comparator (differential amplifier).

The convolver 5 is responsive to the magnitude of the received electric field to produce a peak value signal (true correlation signal) Vcp and a spurious noise (other correlation output) Vs which vary as shown in FIGS. 3A and 3B. The peak value signal Vcp is supplied at x(t) intervals as shown in FIG. 3C. In the peak value comparator circuit 8, the peak value signal Vcp is detected by turning on the switch 20 at x(t) intervals as shown in FIG. 3C the switch 21 is turned on to detect the spurious Vs. The signal Vcp and the spurious Vs are integrated by the integrators 22 and 23, respectively, and they are subsequently applied to the comparator 24 which obtains an output signal Vc responsive to the comparison and gives it to the reference signal control circuit 6.

FIG. 4 shows an arrangement of the reference signal control circuit 6. In the same drawing, D1 refers to a pin diode, D2 to a diode, Tr to a transistor, C1 and C2 to capacitors, and R1 to R4 to resistors.

The output signal Vc from the peak value comparator circuit 8 is applied to the base of the transistor Tr. The amount of attenuation by the pin diode D1 varies with the output signal Vc and controls the power of the reference signal. In other words, since the comparison between Vcp and Vs varies with the ratio of the output signal Vc and an input reference signal Vr, the reference signal Vr is controlled in response to the signal Vc so that the difference is maximized.

Figure 5:
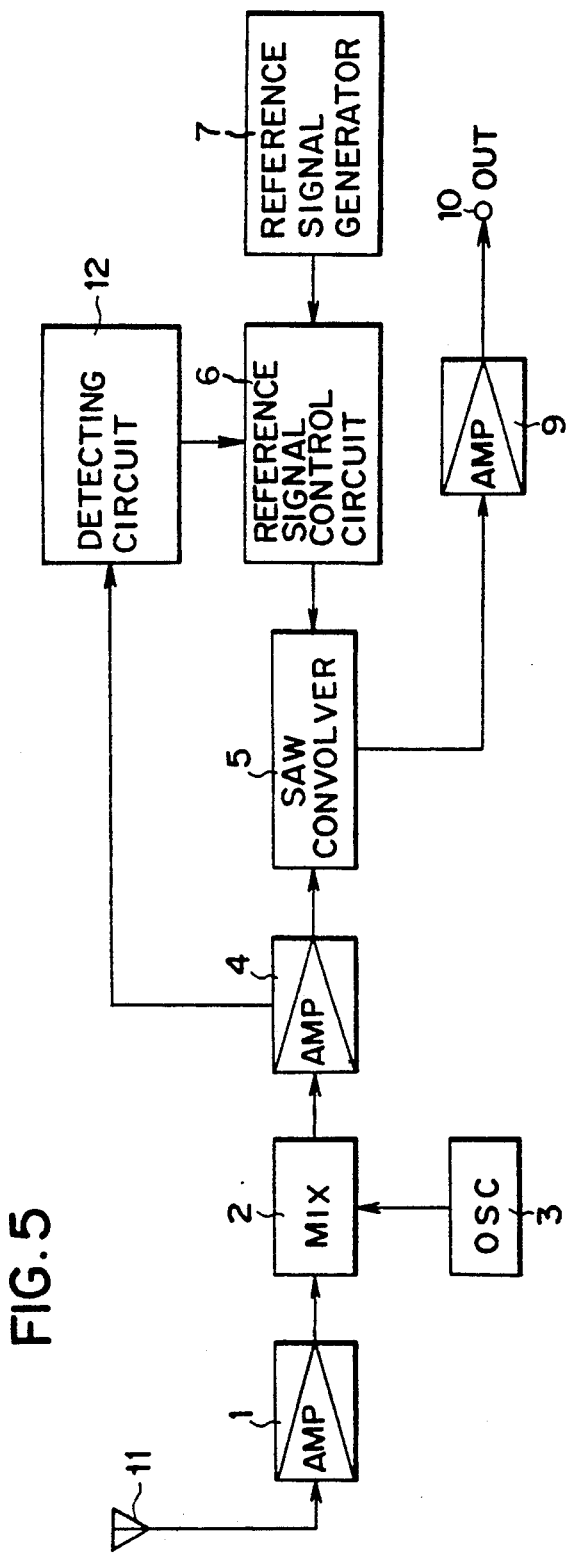
FIG. 5 is a block diagram of a further embodiment of the invention.

FIG. 5 shows a further embodiment of the invention, and shows some circuit elements equivalent to those of FIG. 1 at the same reference numerals. The circuit of FIG. 5 is different from the circuit of FIG. 1 in that a detector circuit 12 is used in lieu of the peak value comparator circuit 8.

The detector circuit 12 detects the output signal of the AGC amplifier 4, and supplies a detected signal responsive to the received input signal level to the control circuit 6. The control circuit 6 controls the level of the reference signal to represent an optimum value in response to the detected signal.

Figure 6:
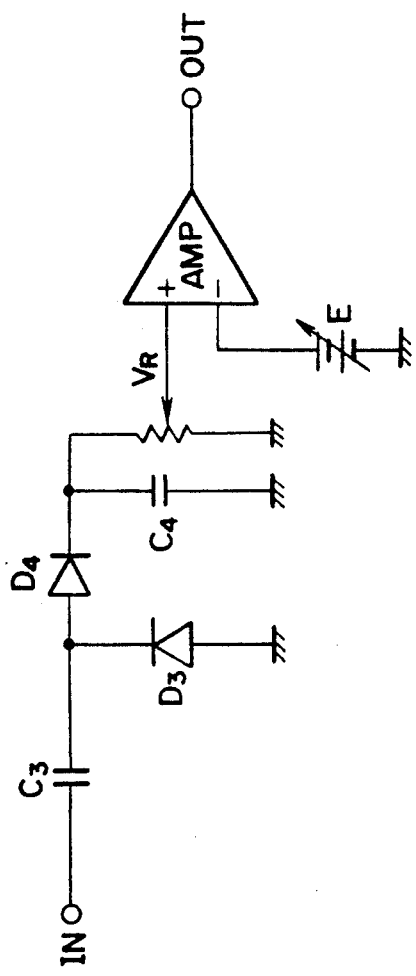
FIG. 6 is a circuit diagram of a detector circuit.

FIG. 6 shows an arrangement of the detector circuit 12. In the same drawing, D3 and D4 refer to diodes, C3 and C4 to capacitors, VR to a variable resistor, E to a d.c. power supply, and AMP to a differential amplifier.

When the output signal of the AGC amplifier 4 is applied to the input terminal IN, its high frequency component is detected by the diodes D3 and D4, and a detected d.c. signal responsive to the level of the high frequency component, and passing through the differential amplifier AMP is obtained at the output terminal. The detected signal is applied to, for example, the base of the transistor Tr of the control circuit 6 in FIG. 4.

As described above, according to the invention, since the reference signal level is controlled to represent an optimum level, the convolver sensitivity is improved, and the efficiency of the receiver is increased.

What is claimed is:

1. A spread spectrum receiver circuit comprising:
a reference signal generator for producing a reference signal;
a convolver for producing a correlation output correlating between a received input signal and said reference signal to perform demodulation;
peak value comparator means for producing an output varying responsively to the difference between true correlation outputs and other correlation outputs of said convolver; and
reference signal control means disposed between said reference signal generator and said convolver responsive to said output of said peak value comparator means for controlling the level of said reference signal applied to said convolver to vary according to the magnitude of said output of said peak value comparator means.

2. The spread spectrum receiver according to claim 1 wherein said peak value comparator means compresses first switch means for selectively accessing the output of said convolver during the appearance of true correlation outputs, second switch means for selectively accessing the output of said convolver during the appearance of said other correlation outputs, first integrating means for integrating the output accessed by said first switch by said second switch means and a comparator for producing said output of said peak value comparator means responsively to the difference between the outputs of said first and second integrating means.

3. A spread spectrum receiver circuit comprising:
reference signal generator means for producing a reference signal;
a convolver for obtaining correlation outputs between a received input signal and said reference signal to perform demodulation;
detector means for producing a detected signal responsive to the level of said received input signal; and
reference signal control means connected between said reference signal generator and said convolver and responsive to said output of said detector means for controlling the level of said reference signal according to the strength of said detected signal.

4. The spread spectrum receiver circuit according to claim 3 wherein said detector includes means for detecting a high frequency component in said received input signal and means for producing said detected signal responsively thereto in the form of a DC level varying according to the amplitude of said high frequency component.

5. The spread spectrum receiver according to claim 1 wherein said reference signal control means includes means for controlling the level of said reference signal in response to said output of said peak value comparator means so that said reference signal level becomes small when said output of said peak value comparator means becomes large so as to maximize the difference between said true correlation outputs and said other correlation outputs.

6. The spread spectrum receiver according to claim 3 wherein said reference signal control means includes means for controlling the level of said reference signal in response to said output of said detector means so that said reference signal level becomes small when the detected signal becomes large so as to maximize the difference between said true correlation outputs and said other correlation outputs.

* * * * *